(12) United States Patent
Ovshinsky et al.

(10) Patent No.: US 7,033,699 B2
(45) Date of Patent: *Apr. 25, 2006

(54) FUEL CELL CATHODES AND THEIR FUEL CELLS

(75) Inventors: Stanford R. Ovshinsky, Bloomfield Hills, MI (US); Srinivasan Venkatesan, Southfield, MI (US); Hong Wang, Troy, MI (US); Boyko Aladjov, Rochester Hills, MI (US)

(73) Assignee: Ovonic Fuel Cell Company LLC, Rochester Hills, MI (US)

( * ) Notice: Subject to any disclaimer, the term of this patent is extended or adjusted under 35 U.S.C. 154(b) by 280 days.

This patent is subject to a terminal disclaimer.

(21) Appl. No.: 10/678,719

(22) Filed: Oct. 3, 2003

(65) Prior Publication Data

US 2004/0131906 A1    Jul. 8, 2004

Related U.S. Application Data

(63) Continuation-in-part of application No. 10/185,414, filed on Jun. 28, 2002, now Pat. No. 6,777,125, which is a continuation-in-part of application No. 09/797,332, filed on Mar. 1, 2001, now Pat. No. 6,620,539.

(51) Int. Cl.
H01M 4/32 (2006.01)
H01M 4/52 (2006.01)
H01M 4/00 (2006.01)
H01M 4/82 (2006.01)
H01M 4/90 (2006.01)

(52) U.S. Cl. .................. 429/223; 429/27; 429/40; 429/42; 429/44; 429/218.1; 429/224; 429/217; 429/229; 429/219; 429/220; 429/222

(58) Field of Classification Search .......... 429/218.1, 429/223, 219, 220, 222, 229, 224, 217, 27
See application file for complete search history.

(56) References Cited

U.S. PATENT DOCUMENTS

| 3,791,896 A | * | 2/1974 | Sklarchuk ............. 429/42 |
| 4,362,791 A | * | 12/1982 | Kaneko et al. ........ 429/101 |
| 5,318,865 A | | 6/1994 | Kaneko et al. |
| 6,090,504 A | | 7/2000 | Sung et al. |

* cited by examiner

Primary Examiner—Patrick Joseph Ryan
Assistant Examiner—Angela J Martin
(74) Attorney, Agent, or Firm—Frederick W. Mau, II; Marvin S. Siskind

(57) ABSTRACT

Fuel cell cathodes and instant startup fuel cells employing the cathodes. The cathodes operate through the valency change mechanism of redox couples which uniquely provide multiple degrees of freedom in selecting the operating voltages available for such fuel cells. Such cathodes provide the fuel cells in which they are used a "buffer" or "charge" of oxidizer available within the cathode at all times.

16 Claims, 5 Drawing Sheets

FUEL CELL CATHODES AND THEIR FUEL CELLS

RELATED APPLICATIONS

The present invention is a continuation-in-part of U.S. patent application Ser. No. 10/185,414, which is assigned to the same assignee as the current application, entitled "FUEL CELL CATHODE WITH REDOX COUPLE", filed Jun. 28, 2002, now U.S. Pat. No. 6,777,125 which is a continuation-in-part of U.S. patent application Ser. No. 09/797,332, which is assigned to the same assignee as the current application, entitled "Novel Fuel Cell Cathodes and Their Fuel Cells", filed Mar. 1, 2001, now U.S. Pat. No. 6,620,539, the disclosure of which is hereby incorporated by reference.

FIELD OF THE INVENTION

The instant invention relates to generally to useful cathodes active materials for fuel cells, more specifically to their use as the cathode material for instant startup alkaline fuel cells. These inventive cathodes open up a tremendous number of degrees of freedom in fuel cell design by utilizing the change in valency states via reduction/oxidation of the cathode active material.

BACKGROUND OF THE INVENTION

The instant application for the first time provides cathodes, and fuel cells using such electrodes, which use oxide couples to yield a wide selection of operating voltages. Specifically, the instant inventors have determined materials, when used in combination with hydrogen electrodes including hydrogen storage material, yield high performance fuel cells. The high performance fuel cells have hydrogen storage capacity within the hydrogen electrode and cathodes which take advantage of low-cost, in comparison with the traditional platinum electrodes, oxide couples which allow selection of specific ranges of operating voltage of the electrochemical cells with a broad operating temperature range and the opportunity to provide instant-start by use of the hydrogen storage capability of the short-range order available in the material of the hydrogen electrode.

As the world's human population expands, greater amounts of energy are necessary to provide the economic growth all nations desire. The traditional sources of energy are the fossil fuels which, when consumed, create significant amounts of carbon dioxide as well as other more immediately toxic materials including carbon monoxide, sulfur oxides, and nitrogen oxides. Increasing atmospheric concentrations of carbon dioxide are warming the earth; creating the ugly specter of global climatic changes. Energy-producing devices which do not contribute to such difficulties are needed now.

A fuel cell is an energy-conversion device that directly converts the energy of a supplied gas into an electric energy. Highly efficient fuel cells employing hydrogen, particularly with their simple combustion product of water, would seem an ideal alternative to current typical power generations means. Researchers have been actively studying such devices to utilize the fuel cell's potential high energy-generation efficiency.

The base unit of the fuel cell is a cell having a cathode, an anode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Presently most of the fuel cell R & D is focused on P.E.M. (Proton Exchange Membrane) fuel cells. Regrettably, the P.E.M. fuel cell suffers from relatively low conversion efficiency and has many other disadvantages. For instance, the electrolyte for the system is acidic. Thus, noble metal catalysts are the only useful active materials for the electrodes of the system. Unfortunately, not only are the noble metals costly, they are also susceptible to poisoning by many gases, specifically carbon monoxide (CO). Also, because of the acidic nature of the P.E.M fuel cell electrolyte, the remainder of the materials of construction of the fuel cell need to be compatible with such an environment, which again adds to the cost thereof. The proton exchange membrane itself is quite expensive, and because of it's low proton conductivity at temperatures below 80° C., inherently limits the power performance and operational temperature range of the P.E.M. fuel cell as the PEM is nearly non-functional at low temperatures. Also, the membrane is sensitive to high temperatures, and begins to soften at 120° C. The membrane's conductivity depends on water and dries out at higher temperatures, thus causing cell failure. Therefore, there are many disadvantages to the P.E.M. fuel cell which make it somewhat undesirable for commercial/consumer use.

The conventional alkaline fuel cell has some advantages over P.E.M. fuels cells in that they have higher operating efficiencies, they use less costly materials of construction, and they have no need for expensive membranes. The alkaline fuel cell also has relatively higher ionic conductivity in the electrolyte, therefore it has a much higher power capability. While the conventional alkaline fuel cell is less sensitive to temperature than the PEM fuel cell, the platinum active materials of conventional alkaline fuel cell electrodes become very inefficient at low temperatures. Unfortunately, conventional alkaline fuel cells still suffer from their own disadvantages.

For example, conventional alkaline fuel cells still use expensive noble metal catalysts in both electrodes, which, as in the P.E.M. fuel cell, are susceptible to gaseous contaminant poisoning. The conventional alkaline fuel cell is also susceptible to the formation of carbonates from $CO_2$ produced by oxidation of the anode carbon substrates or introduced via impurities in the fuel and air used at the electrodes. This carbonate formation clogs the electrolyte/electrode surface and reduces/eliminates the activity thereof. The invention described herein eliminates this problem from the anode.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the anode for hydrogen oxidation and the cathode for oxygen reduction, both being positioned in a cell containing an electrolyte (such as an alkaline electrolytic solution). Typically, the reactants, such as hydrogen and oxygen, are respectively fed through a porous anode and cathode and brought into surface contact with the electrolytic solution. The particular materials utilized for the cathode and anode are important since they must act as efficient catalysts for the reactions taking place.

In an alkaline fuel cell, the reaction at the anode occurs between the hydrogen fuel and hydroxyl ions (OH⁻) present in the electrolyte, which react to form water and release electrons:

$$H_2 + 2OH^- \rightarrow 2H_2O + 2e^- \quad E_0 = -0.828 \text{ v}.$$

At the cathode, the oxygen, water, and electrons react in the presence of the cathode catalyst to reduce the oxygen and form hydroxyl ions (OH⁻):

$$O_2 + 2H_2O + 4e^- \rightarrow 4OH^- \quad E_0 = -0.401 \text{ v}.$$

The total reaction, therefore, is:

$$2H_2 = O_2 \rightarrow 2\, 2H_2O \quad E_0 = -1.229 \text{ v}$$

The flow of electrons is utilized to provide electrical energy for a load externally connected to the anode and cathode.

It should be noted that the anode catalyst of the alkaline fuel cell is required to do more than catalyze the reaction of H⁺ ions with OH⁻ ions to produce water. Initially the anode must catalyze and accelerate the formation of H⁺ ions and e⁻ from H₂. This occurs via formation of atomic hydrogen from molecular hydrogen. The overall reaction may be simplified and presented (where M is the catalyst) as:

$$M + H_2 \rightarrow 2M \ldots H \rightarrow M + 2H^+ + 2e^-.$$

Thus the anode catalyst must not only efficiently catalyze the electrochemical reaction for formation of water at the electrolyte interface but must also efficiently dissociate molecular hydrogen into atomic hydrogen. Using conventional anode material, the dissociated hydrogen is transitional and the hydrogen atoms can easily recombine to form hydrogen if they are not used very efficiently in the oxidation reaction. With the hydrogen storage anode materials of the inventive instant startup fuel cells, hydrogen is stored in hydride form as soon as they are created, and then are used as needed to provide power.

In addition to being catalytically efficient on both interfaces, the catalytic material must be resistant to corrosion by the alkaline electrolyte. Without such corrosion resistance, the electrode would quickly succumb to the harsh environment and the cell would quickly lose efficiency and die.

One prior art fuel cell anode catalyst is platinum. Platinum, despite its good catalytic properties, is not very suitable for wide scale commercial use as a catalyst for fuel cell anodes, because of its very high cost, availability, and the limited world supply. Also, noble metal catalysts like platinum, also cannot withstand contamination by impurities normally contained in the hydrogen fuel stream. These impurities can include carbon monoxide which may be present in hydrogen fuel or contaminants contained in the electrolyte such as the impurities normally contained in untreated water including calcium, magnesium, iron, and copper.

The above contaminants can cause what is commonly referred to as a "poisoning" effect. Poisoning occurs where the catalytically active sites of the material become inactivated by poisonous species invariably contained in the fuel cell. Once the catalytically active sites are inactivated, they are no longer available for acting as catalysts for efficient hydrogen oxidation reaction at the anode. The catalytic efficiency of the anode therefore is reduced since the overall number of available catalytically active sites is significantly lowered by poisoning. In addition, the decrease in catalytic activity results in increased over-voltage at the anode and hence the cell is much less efficient adding significantly to the operating costs. Overvoltage is the difference between the actual working electrode potential under some conditions and it's equilibrium value, the physical meaning of overvoltage is the voltage required to overcome the resistance to the passage of current at the surface of the anode (charge transfer resistance). The overvoltage represents an undesirable energy loss which adds to the operating costs of the fuel cell.

In related work, U.S. Pat. No. 4,623,597 ("the '597 patent") and others in it's lineage, the disclosure of which is hereby incorporated by reference, one of the present inventors, Stanford R. Ovshinsky, described disordered multicomponent hydrogen storage materials for use as negative electrodes in electrochemical cells for the first time. In this patent, Ovshinsky describes how disordered materials can be tailor made (i.e., atomically engineered) to greatly increase hydrogen storage and reversibility characteristics. Such disordered materials are amorphous, microcrystalline, intermediate range order, and/or polycrystalline (lacking long range compositional order) wherein the polycrystalline material includes topological, compositional, translational, and positional modification and disorder. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed the batteries to be utilized most advantageously as secondary batteries, but also as primary batteries.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. Disorder permits degrees of freedom, both of type and of number, within a material, which are unavailable in conventional materials. These degrees of freedom dramatically change a materials physical, structural, chemical and electronic environment. The disordered material of the '597 patent have desired electronic configurations which result in a large number of active sites. The nature and number of storage sites were designed independently from the catalytically active sites.

Multiorbital modifiers, for example transition elements, provided a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods there between resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of electro-catalytically active sites and hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

Disorder can be of an atomic nature in the form of compositional or configurational disorder provided throughout the bulk of the material or in numerous regions of the material. The disorder also can be introduced by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, regions of an amorphous phase or phases in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve important improved and unique results, using the Ovshinsky principles of disorder on an atomic or microscopic scale.

Additionally, in copending U.S. application Ser. No. 09/524,116, ('116), the disclosure of which is hereby incorporated by reference, Ovshinsky has employed the principles of atomic engineering to tailor materials which uniquely and dramatically advance the fuel cell art. The invention of '116 application has met a need for materials which allow fuel cells to startup instantaneously by providing an internal source of fuel, to operate in a wide range of ambient temperatures to which a fuel cell will be exposed to under ordinary consumer use and to allow the fuel cell to be run in reverse as an electrolyzer thereby utilizing/storing recaptured energy. The anodes of the '116 fuel cells are formed from relatively inexpensive hydrogen storage materials which are highly catalytic to the dissociation of molecular hydrogen and the formation of water from hydrogen and hydroxyl ions as well as being corrosion resistant to the electrolyte, resistant to contaminant poisoning from the reactant stream and capable of working in a wide temperature range.

The next step in the evolution of the fuel cell would be to find suitable materials to replace the expensive platinum cathode catalysts of conventional fuel cells. It would also be advantageous to provide the cathode with the ability to store chemical energy (possibly in the form of chemically bound oxygen) to assist in the instant startup of the fuel cell as well as recapture energy Thus there is a need within the art for such a material. The invention described this application is significant in that it provides the next step in the development of such electrochemical cells. With this invention, the cathode can be selected from a broad menu of available possible redox couples. These redox couples in addition to providing a store of chemical energy, allow the operating voltage of the fuel cell to be selected, by judicious choice of the redox couple used.

SUMMARY OF THE INVENTION

The present invention discloses cathodes utilizing a novel cathode active material. When utilized in fuel cell cathodes, the cathode active material provides the fuel cell with the ability to start up instantly and accept recaptured energy such as that of regenerative braking by operating in reverse as an electrolyzer. The instant startup fuel cells have increased efficiency and power availability (higher voltage and current) and a dramatic improvement in operating temperature range (−20 to 150° C.) The fuel cells of the instant invention also have additional degrees of freedom over the fuel cells of the prior art in that the voltage output of the cell can be tailored and they are capable of storing regenerated energy.

The cathodes of the present invention operate through the mechanism of valency change reactions which uniquely provide multiple degrees of freedom in selecting the operating voltages available for such fuel cells. Such cathodes provide the fuel cells in which they are used, particularly alkaline fuel cells, with a level of chemical energy storage within the cathode itself. This means that such fuel cells will have a "buffer" or "charge" available within the cathode at all times.

The cathode in accordance with the present invention comprises a cathode active material including a valency change material. The valency change material provides the cathode with an oxygen storage capacity. The valency change material may be a nickel hydroxide/nickel oxyhydroxide redox couple, a metal/metal oxide redox couple of an element selected from copper, silver, zinc and cadmium, a metal oxide/oxide redox couple of a metal such as manganese, or a cobalt hydroxide/oxyhydroxide redox couple.

The cathode may further include a hydrophobic component such as polytetrafluoroethylene (PTFE). The hydrophobic component may be a) intimately mixed with the cathode active material, b) graded within the cathode active material, or c) a separate layer within the cathode. The cathode may further include a current collector extending within the cathode active material. The current collector may comprise an electrically conductive mesh, grid, foam or expanded metal. The further including a catalytic carbon component.

DESCRIPTION OF THE PREFERRED EMBODIMENTS OF THE PRESENT INVENTION

Figure 1:
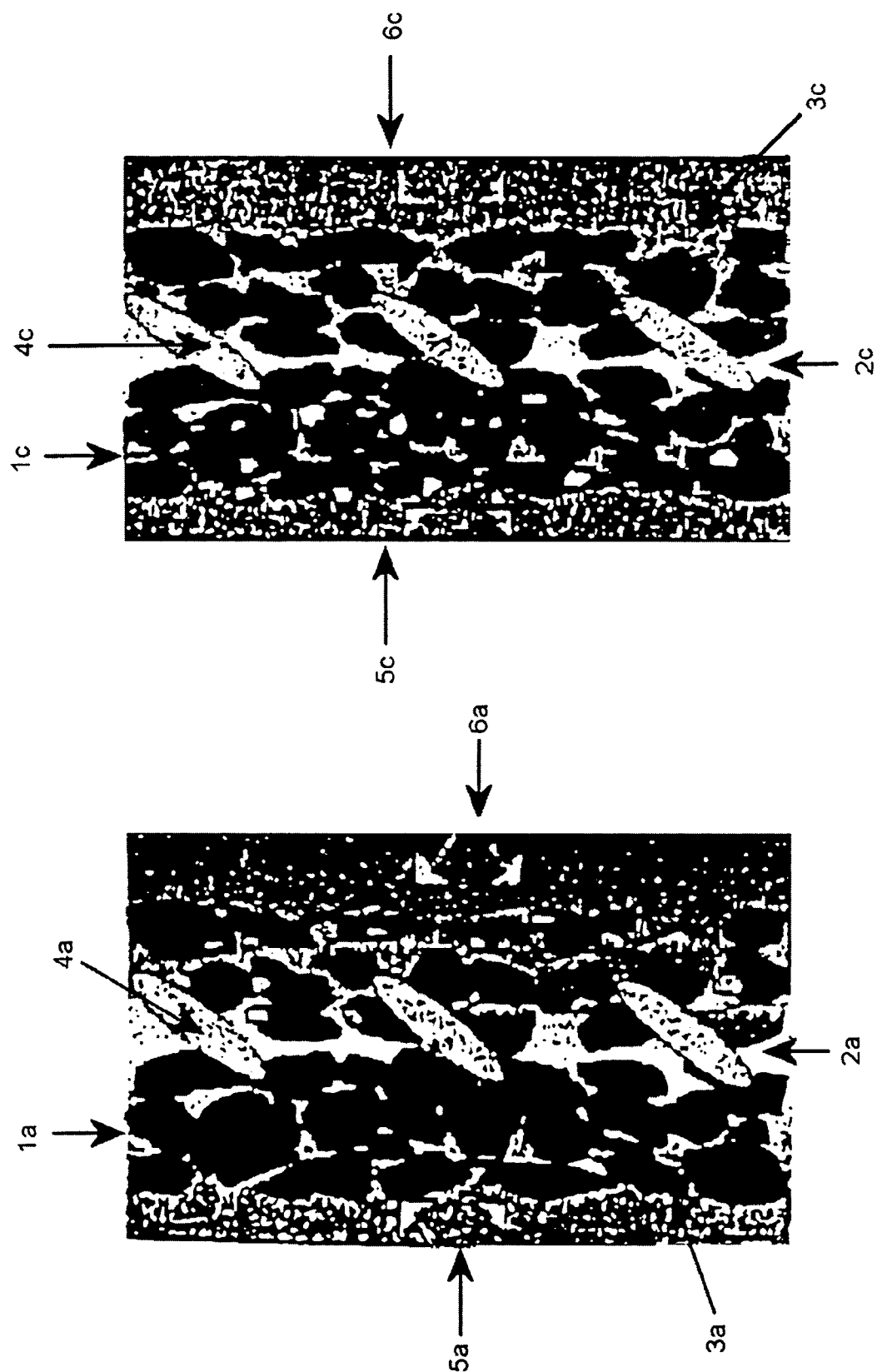
FIG. 1A is a stylized schematic depiction of a fuel cell anode used in the fuel cells of the instant invention.
FIG. 1B is a stylized schematic depiction of an inventive fuel cell cathode used in the fuel cells of the instant invention.

The present invention relates to cathodes for fuel cells which operate through the mechanism of valency change reactions of redox couples. The mechanism of valency change reactions uniquely provides multiple degrees of freedom in selecting the operating voltages available for such fuel cells by selecting from the many variable and reversible redox couples available. Such cathodes, or cathodes, provide the fuel cells in which they are used, particularly alkaline fuel cells, with a level of electrochemical energy storage via a change in valency state within the cathode itself. This means that such fuel cells will have a "buffer" or "charge" of reactant available within the cathode at all times which, particularly combined with hydrogen storage anodes described in copending U.S. application Ser. No. 09/524,116 (the disclosure of which is hereby incorporated by reference), yield instant start fuel cells in general and more specifically to instant start alkaline fuel cells. Such fuel cells have a built in reserve of hydrogen within the anode and cathode reactant (possibly oxygen) in the cathode for instant startup (discussed herein below), and have the ability to accept the energy of regenerative braking by acting as an electrolyzer (also discussed herein below). The fuel cell has increased efficiency and increased power capabilities as compared with conventional fuel cells of the prior art, while dramatically increasing the operating temperature range of the cell (−20 to 150° C.) The fuel cell is easy to assemble and has the advantage of utilizing proven, low cost production techniques.

The present invention also relates to fuel cell anodes and cathodes, and an energy supply system incorporating the present fuel cell. The fuel cell anode includes materials which have inherent catalytic activity as well as hydrogen storage capacity. The cathode and anode materials do not include any noble metals, and are therefore inherently low cost. The cathode and anode materials are robust and long-lived, being resistant to poisoning. The anode does not utilize the carbon substrates of the prior art. While a detailed discussion of the instant electrodes and their utilization in an alkaline fuel cell is described herein below, it should be noted that the concepts of the instant invention can be applied to other types of fuel cells (e.g. P.E.M. fuel cells or metal-air cells).

In general, for such fuel cell cathodes, oxygen is generally available to the cathode on a continuously-supplied basis on one side of thereof where the catalytically active material converts the molecular oxygen into atomic oxygen which then migrates through the electrode and is reduced at the electrolyte interface of the cathode to form hydroxyl ions. In prior art cathodes, no storage of reactant occurs. That is oxygen travels directly through the active materials and reacts at the electrolyte interface. In the cathodes of the instant invention, oxygen is stored in the cathode via a change in valency state within the reversible redox couples, and is then available, at the electrolyte interface of the cathode. Available electrons will then be generated through the electrochemical reaction with the fuel. Thus the fuel cell will provide a constant supply of electricity at voltages based on the valency change of the reversible redox couple being used (e.g. a metal and its oxide). Additionally, this added benefit may be obtained via a change in valency state in redox couples other than a metal and its oxidized form. An example of this is the redox couple of nickel hydroxide/nickel oxyhydroxide or cobalt hydroxide/oxyhydroxide. Such valency changes may also occur between two different oxides of a metal, such as manganese or tin. In these types of systems, the electrochemical cell will provide a potential whose theoretical voltage limit is the sum of the anode and cathode reactions. Certainly the theoretical limit of voltage available is modified or limited by other considerations, which may include the internal resistance of the electrodes and the complete fuel cell system.

This invention specifically relates to a fuel cell cathode comprising a cathode active material capable of reversibly storing energy through a valency change mechanism of a redox couple. The cathode active material may have a first surface region situated to be exposed to molecular oxygen. The first surface region including a catalytically acting component promoting the absorption of molecular oxygen through said first surface region and conversion thereof into atomic oxygen. The active material also includes a redox couple material (e.g. a metal) which is thereafter chemically charged by reaction with the atomic oxygen resulting in a valency change. The fuel cell cathode also includes a second surface region situated to be exposed to a fuel cell electrolyte. The second surface region includes a catalytic component promoting the valency change reactions between the redox active material and the electrolyte. The cathode may also include a hydrophobic component positioned between the first and second surface regions. Such a fuel cell cathode will display favorable voltage potential over conventional prior art cathodes.

The fuel cell cathodes of this invention may utilize valency change redox couples, particularly metal/oxides couples of metals selected from copper, silver, zinc, cobalt and cadmium, metal oxide/oxide couples of metals selected from manganese or tin, or a nickel hydroxide/nickel oxyhydroxide couple or a cobalt hydroxide/oxyhydroxide couple.

The fuel cell cathodes of the instant invention also include a catalytic material which promotes and speeds the dissociation of molecular oxygen into atomic oxygen (which reacts with the redox couple). A particularly useful catalyst is carbon. As discussed herein below this carbon should be very porous and may be electrically conductive.

The cathode also needs a barrier means to isolate the electrolyte, or wet, side of the cathode from the gaseous, or dry, side of the cathode. A beneficial means of accomplishing this is by inclusion of a hydrophobic component comprising a halogenated organic compound, particularly polytetrafluoroethylene (PTFE) within the electrode.

These fuel cell cathodes, may also include a current collector or current collecting system extending within said active material. As discussed herein below, the current collector may comprise an electrically conductive mesh, grid, foam or expanded metal. The choice of such collection systems may be made according to electrode manufacturing or production system needs.

Fuel cells of the instant invention using cathodes with valency change redox couples, particularly in combination with the hydrogen storage anodes of the '116 application provided the ability to recapture reverse electrical power flow from an external circuit into said fuel cell, electrolytically producing hydrogen and oxygen which are absorbed and stored through the mechanism of valency change reactions within the redox couple in the cathode and the hydrogen storage material in the anode.

Such fuel cells may, as a system, further comprise an electrolyte conditioning means for conditioning the electrolyte. This electrolyte conditioning system will not only adjust the temperature of the electrolyte (for optimal fuel cell performance) but will also remove water from the electrolyte. The water removal is necessary because water is produced as a by-product of the fuel cell's electrochemical combustion. This water, if not removed would dilute the electrolyte, thus impeding the optimal performance of the fuel cell.

These fuel cells will further include, as a system, a hydrogen supply source including means for continuously supplying fuel, particularly molecular hydrogen, to the anode's first surface region; an oxygen supply source which includes means for continuously supplying molecular oxygen to the cathode's first surface region; and an electrolyte conditioning system which includes means for continuously conditioning the electrolyte, thereby enabling continuous operation of the fuel cell as an electrical power source.

Numerous valency change redox couples exist and may be used to form the cathode of this invention. When such couples are used, cycling transition from one valency state (the oxidized form) to another valency state (the reduced form) is accomplished repeatedly and continuously. From a practical point of view, the ability to withstand such cycling is preferred. While not wishing to be bound by theory, the inventors believe that the equations representing some of the many available reactions for the oxygen side of the fuel cell are presented below.

$Co^{+2} \leftrightarrows Co^{+3}$ (Valency level 2 to a valency level 3)

$$Co(OH)_2 + OH^- \rightarrow CoOOH + H_2O + e^- \quad (1)$$

$Co^{+2} \leftrightarrows Co^{+4}$ (Valency level 2 to a valency level 4)

$$Co(OH)_2 + 2OH^- \rightarrow Co(OH)_4 + 2e^-$$

$$Co(OH)_4 \leftrightarrows CoO_2 + 2H_2O \quad (2)$$

$Ni^{+2} \leftrightarrows Ni^{+3}$ (Valency level 2 to valency level 3)

$$Ni(OH)_2 + OH^- \rightarrow NiOOH + H_2O + e^- \quad (3)$$

$Ni^{+2} \leftrightarrows Ni^{+4}$ (Valency level 2 to valency level 4)

$$Ni(OH)_2 + 2OH^- \rightarrow Ni(OH)_4 + 2e^-$$

$$Ni(OH)_4 \rightarrow NiO_2 + 2H_2O \quad (4)$$

$Ag \leftrightarrows Ag^+$ (Valency level 0 to valency level 1)

$$2Ag + 2OH^- \rightarrow Ag_2O + H_2O + e^- \quad (5)$$

$Ag \leftrightarrows Ag^{+2}$ (Valency level 0 to valency level 2)

$$Ag + 2OH^- \rightarrow AgO + H_2O + 2e^- \quad (6)$$

$Cu \leftrightarrows Cu^{+2}$ (Valency level 0 to valency level 2)

$$Cu + 2OH^- \rightarrow CuO + H_2O + 2e^- \quad (7)$$

$$(Ni/Ag)^{+2} \leftrightarrows (Ni/Ag) \quad (8)$$

$$(Ni/Fe) \text{ oxide}^{+2} \leftrightarrows (Ni/Fe) \text{oxide}^{+3} \quad (9)$$

$$Mn^{+2} \leftrightarrows Mn^{+3} \rightarrow Mn^{+7} \quad (10)$$

$$Sn^{+2} \leftrightarrows Sn^{+4} \quad (11)$$

Groups 8, 9, 10, and 11 are comprised of multiple elements having multiple valency states. The multiple valency states may create difficulty in predicting which reaction is predominant in each grouping.

As noted earlier, the previous sets of reactions provide a few exemplary valency change reactions which will be useful for the air or oxygen side of fuel cells using the cathodes of this invention. These examples are provided simply to demonstrate useful couples; the list certainly is not exhaustive, nor is it intended to be so. Many other valency change redox couples are available and will have useful application in the inventive oxygen-side electrodes which are, in turn, useful in the described inventive fuel cells.

Quantifying the useful benefits of a few of these couples it should be noted that use of the copper/copper oxide couple will yield voltage of about 0.8 v per cell; silver/silver (+2 oxidation state) oxide will yield voltage of about 0.9 v per cell; nickel oxyhydroxide/nickel hydroxide will yield voltage of about 1 v per cell. It should also be considered that there are a number of complex oxides which will yield differing cell voltages which expands the available working voltages even further. Nickel ferrate ($NiFeO_4$) is one such oxide whose complex is available to be used and whose voltage contribution would be about 1 volt. This and other "mixed" oxide complexes provide other useful voltage opportunities as part of this invention. The nickel oxyhydroxide/hydroxide which was previously discussed is, effectively, another complex oxide system. Some of these offer unique multi-step reactions which may be advantageously applied in the practice of this invention.

At the cathode, the oxygen, water, and electrons react in the presence of the cathode active material to reduce the oxygen and form hydroxyl ions ($OH^-$):

$$O_2 + 2H_2O + 4e^- \rightarrow 4OH^-.$$

The flow of electrons is utilized to provide electrical energy for a load externally connected to the anode and cathode. That load is available to be filled by any number of needs including, but not limited to, powering motive vehicles, lighting devices, heating or cooling devices, power tools, entertainment devices, and other electricity-consuming devices too numerous to mention.

In a fuel cell, the cathodes just described (employing any of the many valency change redox couples) are used in conjunction with an anode or hydrogen electrode. While any functional hydrogen electrode may be used with the inventive cathodes, preferred embodiments of the fuel cells of this invention will include anodes employing hydrogen storage alloy active materials. It should be noted that the preferred anode catalyst of the alkaline fuel cell is required to do more than catalyze the reaction of $H^+$ ions with $OH^-$ ions to produce water. Initially the anode must catalyze and accelerate the formation of H⁺ ions and e⁻ from H₂. This occurs via formation of atomic hydrogen from molecular hydrogen. The overall reaction can be seen as (where M is the hydrogen storage anode active alloy material):

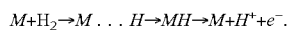

That is, molecular hydrogen (H₂) is converted to adsorbed atomic hydrogen (M . . . H) onto the surface of the anode. This adsorbed hydrogen is very quickly converted to a metal hydride (MH) in the bulk of the hydrogen storage alloy. This hydride material is then converted to ionic H⁺ releasing an electron e⁻. The ionic hydrogen reacts with a hydroxyl ion in the electrolyte to produce water and the electron is released into the external load circuit. Thus the anode catalyst must not only efficiently catalyze the formation of water at the electrolyte interface, but must also efficiently dissociate molecular hydrogen into ionic hydrogen. Using conventional anode material, the dissociated hydrogen is transitional and the hydrogen atoms can easily recombine to form hydrogen if they are not used very quickly in the oxidation reaction. With hydrogen storage anode materials, hydrogen is trapped in hydride form as soon as hydrides are created. The hydrogen, as electrochemically released into the electrolyte, are then used as needed to provide the fuel cell's electrical power output.

In addition to being catalytically efficient on both interfaces, the catalytic material must be resistant to corrosion by the alkaline electrolyte. Without such corrosion resistance, the electrode would quickly succumb to the harsh environment and the cell would quickly lose efficiency and die.

One prior art fuel cell anode catalyst is platinum. Platinum, despite its good catalytic properties, is not very suitable for wide scale commercial use as a catalyst for fuel cell anodes, because of its very high cost. Also, noble metal catalysts like platinum cannot withstand contamination by impurities normally contained in the hydrogen fuel stream. These impurities can include carbon monoxide (which may be present in hydrogen fuel) or contaminants contained in the electrolyte such as the impurities normally contained in untreated water such as calcium, magnesium, iron, and copper.

The above contaminants can cause what is commonly referred to as a "poisoning" effect. Poisoning occurs where the catalytically active sites of the material become inactivated by poisonous species invariably contained in the fuel cell. Once the catalytically active sites are inactivated, they are no longer available for acting as catalysts for efficient hydrogen oxidation reaction at the anode. The catalytic efficiency of the anode therefore is reduced since the overall number of available catalytically active sites is significantly lowered by poisoning. In addition, the decrease in catalytic activity results in increased overvoltage at the anode making the cell much less efficient resulting in an increase to the operating costs. Overvoltage is the difference between the electrode potential and it's equilibrium value, the physical meaning of over-voltage is the voltage required to overcome the resistance to the passage of current at the surface of the anode (charge transfer resistance). The overvoltage represents an undesirable energy loss which adds to the operating costs of the fuel cell.

Without intending to limit the true scope of this invention, but rather for the purpose of explanation and making the current invention more understandable, explanatory drawings are provided. FIGS. 1A and 1B are stylized schematic depictions of a fuel cell storage electrodes 1a and 1c ("a" designates anode and "c" designates cathode). The anode 1a preferably comprises a hydrogen storage active material and the cathode preferably comprises a cathode active material including a valency change redox couple. The electrode body includes, in a preferred embodiment a hydrophobic component 2a (anode) and 2c (cathode). The hydrophobic component may be polytetrafluoroethylene (PTFE). The electrodes also include either a region comprising hydrogen storage active material 3a for the anode, or a region comprising at least one valency change redox couple 3c for the cathode. While FIGS. 1A and 1B show the hydrophobic component 2a, 2c and the active electrode material component 3a, 3c as separate layers of material within the electrodes 1a, 1c, they may also be intimately mixed into a single material or graded throughout the active material. The electrodes 1a, 1c also include a substrate component 4a (anode) or 4c (cathode), which at least acts as a current collector, but may also provide a support function. This substrate component is discussed herein below.

The electrodes 1a, 1c have two surfaces 5a (anode) or 5c (cathode), and 6a (anode) or 6c (cathode). One surface of each electrode 5a, 5c is adjacent a reactant (i.e. hydrogen or oxygen) which is usefully supplied by an inlet mechanism when incorporated into the fuel cell, while the other surface 6a, 6c is adjacent to the electrolyte (which in a preferred embodiment will be an aqueous alkaline electrolyte). As stated above, the hydrophobic (PTFE) component 2a, 2c is either a layer within the electrodes or is intimately mixed with the active material 3a, 3c. In either case, the purpose of the hydrophobic (PTFE) material is to act as a water barrier, preventing electrolyte or its diluent from escaping from the fuel cell, while at the same time, allowing either the fuel, preferably hydrogen (in the case of the anode) or the oxygen (in the case of the cathode) to pass from the source thereof to the electrode active material 3a, 3c. Thus, a portion of the electrode, surface 6a, 6c (and somewhat interiorly from the surface) is in contact with the electrolyte and acts to oxidize (providing electrons) the fuel, preferably hydrogen in the anode case or reduce (gaining electrons) the oxidizer, preferably oxygen in the cathode case, while the remainder of the electrode material (including surface 5a, 5c) provides for dissociation of molecular hydrogen or oxygen and storage of the dissociated fuel (anode) or oxidizer (cathode) for later reaction at surface 6a, 6c.

In the drawings, the anode active material is a material, such as a platinum based active material or a hydrogen storage material. The preferable hydrogen storage alloy is one which can reversibly absorb and release hydrogen irrespective of the hydrogen storage capacity and has a fast hydrogenation reaction rate, good stability in the electrolyte, and a long shelf-life. It should be noted that, by hydrogen storage capacity, it is meant that the material stores hydrogen in a stable form, in some nonzero amount higher than mere trace amounts. Preferred materials will store about 0.1 weight % hydrogen or more. Preferably, the alloys include, for example, rare-earth/Misch metallic alloys, zirconium, and/or titanium alloys or mixtures thereof. The anode material may even be layered such that the material on the hydrogen input surface 5a is formed from a material which has been specifically designed to be highly catalytic to the dissociation of molecular hydrogen into atomic hydrogen, while the material on electrolyte interface surface 6a is designed to be highly catalytic to the formation of water from hydrogen and hydroxyl ions.

For the cathode, the active material is a composite of a selected valency change redox couple providing for oxygen storage via a valency change and an additional catalytic material. Some preferable valency change redox couples are discussed herein above. As general preferences, the valency change redox couple should reversibly absorb and release oxygen irrespective of the oxygen storage capacity and have a fast oxidation reaction rate, good stability in the electrolyte, and a long shelf-life. It should be noted that, by oxygen storage capacity, it is meant that the material stores oxygen in a stable form via a valency change reaction, in some nonzero amount higher than mere trace amounts.

In either case, for either electrode, the electrode material may be layered such that the material on the fuel, or oxidizer, input surface 5a, 5c is formed from a material which has been specifically designed to be highly catalytic to the dissociation of either the fuel or the oxidizer, while the material on electrolyte interface surface 6a, 6c is designed to be highly catalytic to the formation of water (anode) or hydroxyl ions (cathode). In addition to having exceptional catalytic capabilities, the materials also have outstanding corrosion resistance toward the electrolyte of the fuel cell.

In use, the anode (hydrogen electrode) alloy materials act as 1) a molecular hydrogen decomposition catalyst throughout the bulk of the anode; 2) as a water formation catalyst, forming water from hydrogen and hydroxyl ions (from the aqueous alkaline electrolyte) at surface 6 of the anode; and 3) as an internal hydrogen storage buffer to insure that a ready supply of hydrogen ions is always available at surface 6 (this capability is useful in situations such as fuel cell startup and regenerative energy recapture, discussed herein below).

Specific alloys useful as the anode material are alloys that contain enriched catalytic nickel regions of 50–70 Angstroms in diameter distributed throughout the oxide interface which vary in proximity from 2–300 Angstroms preferably 50–100 Angstroms, from region to region. As a result of these nickel regions, the materials exhibit significant catalysis and conductivity. The density of Ni regions in the alloy of the '591 patent provides powder particles having an enriched Ni surface. The most preferred alloys having enriched Ni regions are alloys having the following composition:

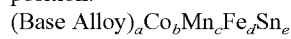
(Base Alloy)$_a$Co$_b$Mn$_c$Fe$_d$Sn$_e$ where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

The substrate component 4a, 4c acts as an electrical conductor and may usefully also act as a support means. For example, if a powdered electrically conductive material, such as nickel, nickel alloy, copper, copper alloy or carbon, is mixed into the active material 3a, 3c then the material acts as an electrically conductive materials, but does not provide any support for the electrode materials per se.

It is preferable that the substrate component act as both an electrical conductor and a support structure. The electrode may be formed by pressing active material into a porous metal substrate. The conductivity of the electrode can be increased by increasing the conductivity of the electrode's porous metal substrate. Generally the porous metal substrate includes, but is not limited to, meshes, grid, matte, foil, foam, plate, and expanded metal. Preferably, the porous metal substrate used for the electrode is a mesh, grid, foam, or expanded metal. The substrate may be formed from any material which is electrically conductive and resistant to corrosion or chemical attack by the electrolyte. Nickel or nickel alloy is a very good material, but for high power applications it may be too resistive. Thus when high power is required, the substrate is formed from copper, copper-plated nickel, or a copper-nickel alloy, as taught by U.S. Pat. No. 5,856,047 (Venkatesan, et al.) and U.S. Pat. No. 5,851, 698 (Reichman et al.), the disclosures of which are hereby incorporated by reference. As used herein, "copper" refers to either pure copper or an alloy of copper, and "nickel" refers to either pure nickel or an alloy of nickel. Using copper to form the porous metal substrate of the electrode has several important advantages. Copper is an excellent electrical conductor. Hence, its use as a substrate material decreases the resistance of the anode. This decreases the amount of fuel cell power wasted due to internal dissipation, and thereby provides a fuel cell having increased output power. Copper is also a malleable metal. Increased substrate malleability allows the substrate to more reliably hold the active hydrogen storage material that is compressed onto the substrate surface. This lessens the need to sinter the electrode after the active material has been compressed onto the substrate, thereby simplifying and reducing the cost of the anode manufacturing process.

The cathode contains an active material component which is catalytic to the dissociation of molecular oxygen into atomic oxygen and/or catalytic to the formation of hydroxyl ions (OH$^-$) and hydrogen from water, corrosion resistant to the electrolyte, and resistant to poisoning.

The cathode is formed in much the same manner as the anode or may be formed in a manner similar to conventional cathodes which use platinum catalysts, but the valency change redox couple materials described above are substituted for the platinum. The valency change redox couple is finely divided and disbursed throughout a porous carbon material. The carbon material may be in the form of a powder, matte, foam, grid or mesh. The cathode may or may not have a conductive substrate as needed. If used the substrate can be as described in relation to the anode.

When the instant fuel cell is run in reverse, as an electrolyzer, during an energy recapture process such as regenerative braking, water is electrolyzed into hydrogen and oxygen. That is, when electric powered vehicles are used in stop and go mode in inner cities, regenerative braking systems can recapture kinetic energy, and convert it to electrical energy. In this mode, the electric motors reverse their roles and become generators using up the kinetic energy of the motion. This causes a spike of current which amounts to about 10% of the normal operating load. A conventional fuel cell (alkaline or PEM) cannot accept such surges. This feedback of energy would cause rapid hydrogen and oxygen evolution which would cause the catalysts to lose their integrity and adhesion thereby undermining the overall system performance.

In the inventive fuel cell, this will not be a problem, because the hydrogen storage anode and the valency change redox couple cathode will take the surge current and become charged with the produced hydrogen or oxygen respectively.

It should be noted that the anode and cathode active materials of the instant invention are robust and very resistant to poisoning. This is true because the increased number of catalytically active sites of these materials not only increases catalytic activity, but enables the materials to be more resistant to poisoning, because with materials of the present invention numerous catalytically active sites can be sacrificed to the effects of poisonous species while a large number of non-poisoned sites still remain active to provide the desired catalysis. Also, some of the poisons are inactivated by being bonded to other sites without effecting the active sites.

Figure 2:
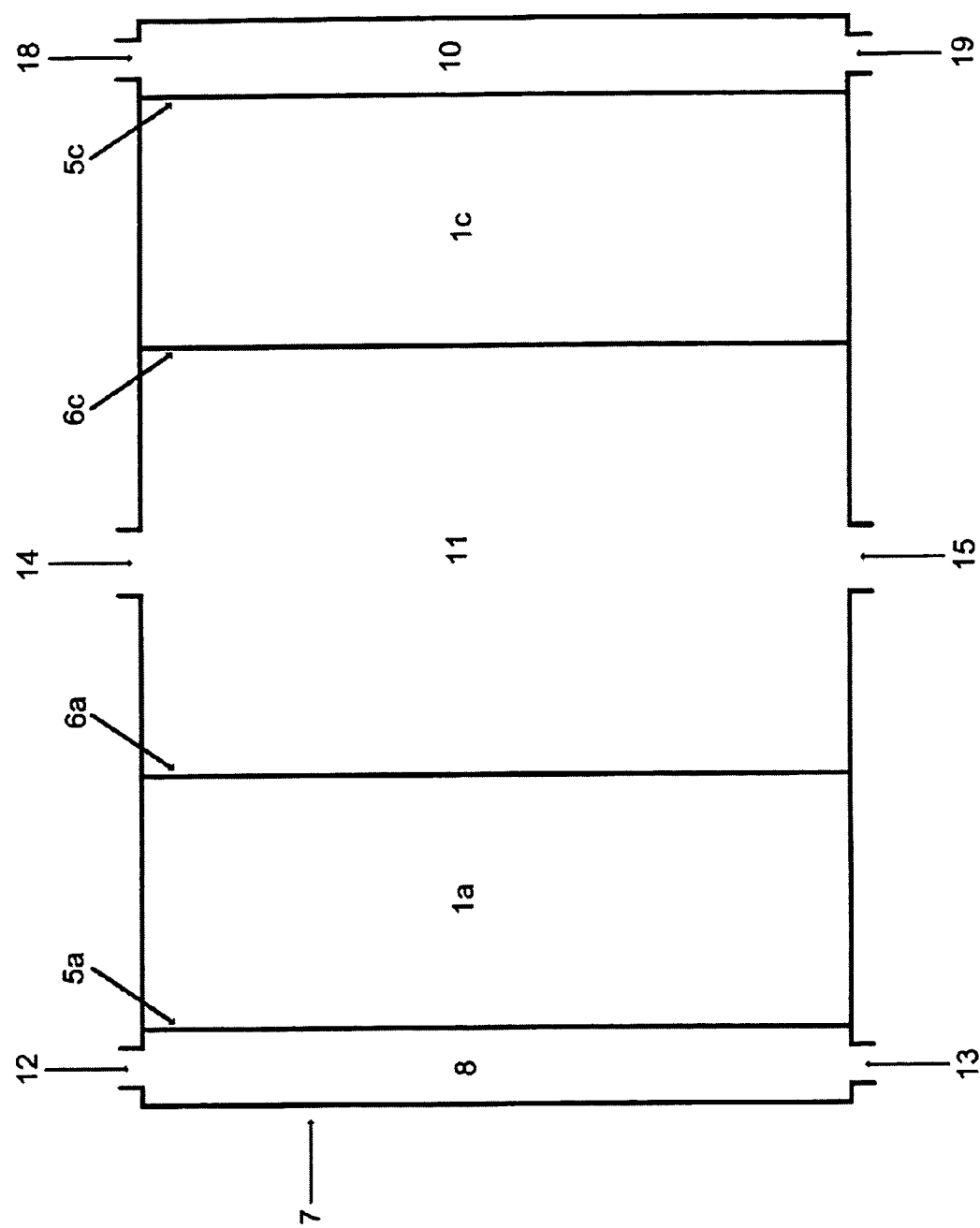
FIG. 2 is a stylized schematic depiction of the instant startup alkaline fuel cell with hydrogen storage anode and oxide couple cathode in a preferred embodiment of the instant invention.

FIG. 2 is a stylized schematic depiction of an alkaline fuel cell 7 incorporating the electrodes 1a, 1c ("a" designates anode and "c" designates cathode) of the instant invention. The fuel cell 7 consists of three general sections: 1) an anode section, which includes the anode 1a and a hydrogen supply compartment 8; 2) the electrolyte compartment 11; and 3) the cathode section, which includes the cathode 1c and the oxygen (air) supply compartment 10.

In the anode section, hydrogen or hydrogen containing gas mixtures is supplied under pressure to the hydrogen supply compartment 8 through hydrogen inlet 12. Hydrogen is then absorbed through surface 5a into the anode 1a. The absorbed hydrogen is catalytically broken down by the anode active material into atomic hydrogen which is stored in the hydrogen storage material as a hydride, and then finally reacts at surface 6a with hydroxyl ions to form water. It should be noted that the heat of hydride formation helps to warm the fuel cell to it's optimal operating temperature. Any unabsorbed hydrogen and other contaminant gases or water vapor in the hydrogen supply are vented through outlet 13. The gases that are vented may be recycled if enough hydrogen is present to warrant recovery. Otherwise the hydrogen may be used to provide a source of thermal energy if needed for other components such as a hydride bed hydrogen storage tank.

The electrolyte compartment 11 holds (in this specific example) an aqueous alkaline electrolyte in intimate contact with the anode 1a and the cathode 1c. The alkaline solution is well known in the art and is typically a potassium hydroxide solution. The electrolyte provides hydroxyl ions which react with hydrogen ions at surface 6a of the anode 1a and water molecules which react with oxygen ions at surface 6c of the cathode 1c. The electrolyte is circulated through compartment 11 via inlet 14 and outlet 15 (in alternative embodiments, the electrolyte may be deliberately immobilized as by jelling, etc.) The circulated electrolyte may be externally heated or cooled as necessary, and the concentration of the electrolyte can be adjusted (as via wicking, etc.) as needed to compensate for the water produced by the cell and any losses due to evaporation of water through the electrodes. Systems for conditioning the fuel cell electrolyte are well known in the art and need not be further described in detail herein.

In the cathode section, oxygen, air, or some other oxygen containing gaseous mixture is supplied to the oxygen supply compartment 10 through oxygen inlet 18. Oxygen is then absorbed through surface 5c into the cathode 1c. The absorbed oxygen is catalytically broken down by the cathode active material into atomic oxygen, which finally reacts at surface 6c (via the valency change mechanism of the redox couple) with water molecules to form hydroxyl ions. Any unabsorbed oxygen and other gases in the feed (e.g. nitrogen, carbon dioxide, etc.) or water vapor in the oxygen supply are vented through outlet 19.

EXAMPLE

Production of a hydrogen storage anode (used in both the inventive fuel cell and the control cell) is described as follows. All percentages given throughout this example are in weight percent, unless otherwise noted. A mixture containing about 90% of a Mischmetal nickel alloy (having an approximate composition of 20.7% La, 8.5% Ce, 1.0% Pr. 2.9% Nd, 49.9% Ni, 10.6% Co, 4.6% Mn, 1.8% Al) and about 10% polytetrafluoroethylene (PTFE) was made into a paste using isopropyl alcohol. This paste was applied into an Inco Corporation nickel foam having a of density of about 500 g/m$^2$ (with a previously welded nickel tab used as a current collector). This foam acts as the substrate and electrical collector for the electrode. After drying at 50–60° C., the anode was compacted using a roll mill to a final thickness of 0.020 to 0.030 inches.

The control sample cathode (oxygen) electrode was created as follows. First, a mixture of Vulcan XC-72 carbon (Trademark of Cabot Corp.) and PTFE was prepared with an approximate PTFE content of 20–30%. Nickel foam of the type used above in the anode production was used as a substrate. A paste (paste A) of the Vulcan XC-72 carbon/PTFE mixture was created using sufficient isopropyl alcohol to produce a workable paste. Paste A was then applied into one side (the electrode/gas interface side) of the foam substrate. A second paste (paste B), consisting of a mixture of approximately of 40–60% of the Vulcan XC-72 carbon/PTFE mixture and a high surface area carbon (Black Pearls 2000, Trademark of Cabot Corp.) was created, again using sufficient isopropyl alcohol to produce a workable paste. Paste B was applied into the other side (the electrode/electrolyte interface side) of the foam. After drying the electrode at 60–100° C., it was compacted to final thickness of 0.030 to 0.040 inches by applying even pressure of 1 to 3 tons/cm$^2$.

The inventive electrode was created in a similar manner as the comparative electrode except that 10% Aldrich silver oxide was added to paste B. The inventive cathode contains only about 0.11 grams of active silver oxide redox material. This amount of silver oxide has an electrochemical capacity of about 40 mAh. At a typical discharge rate of 100 mA/sq.cm, the electrode would be discharged at a current of 1A. At this current, the electrode should be fully discharged in 2.5 minutes if there is no continuous regeneration of the active ingredients. Also the cell voltage, which includes all polarizations, should reflect a higher value if oxygen reduction were occurring by a redox mechanism as opposed to the conventional mechanism.

Fuel cells were created using the same anodes and respectively either the control cathode or the inventive cathode. These fuel cells included a 60 g/m$^2$ polypropylene separator from Daiwabo Corporation, and employed conventional KOH/LiOH alkaline battery electrolyte which was jelled using 3% carboxymethylcellulose. The cells were run using purified hydrogen as the fuel and air as the source of oxygen.

Figure 3A:
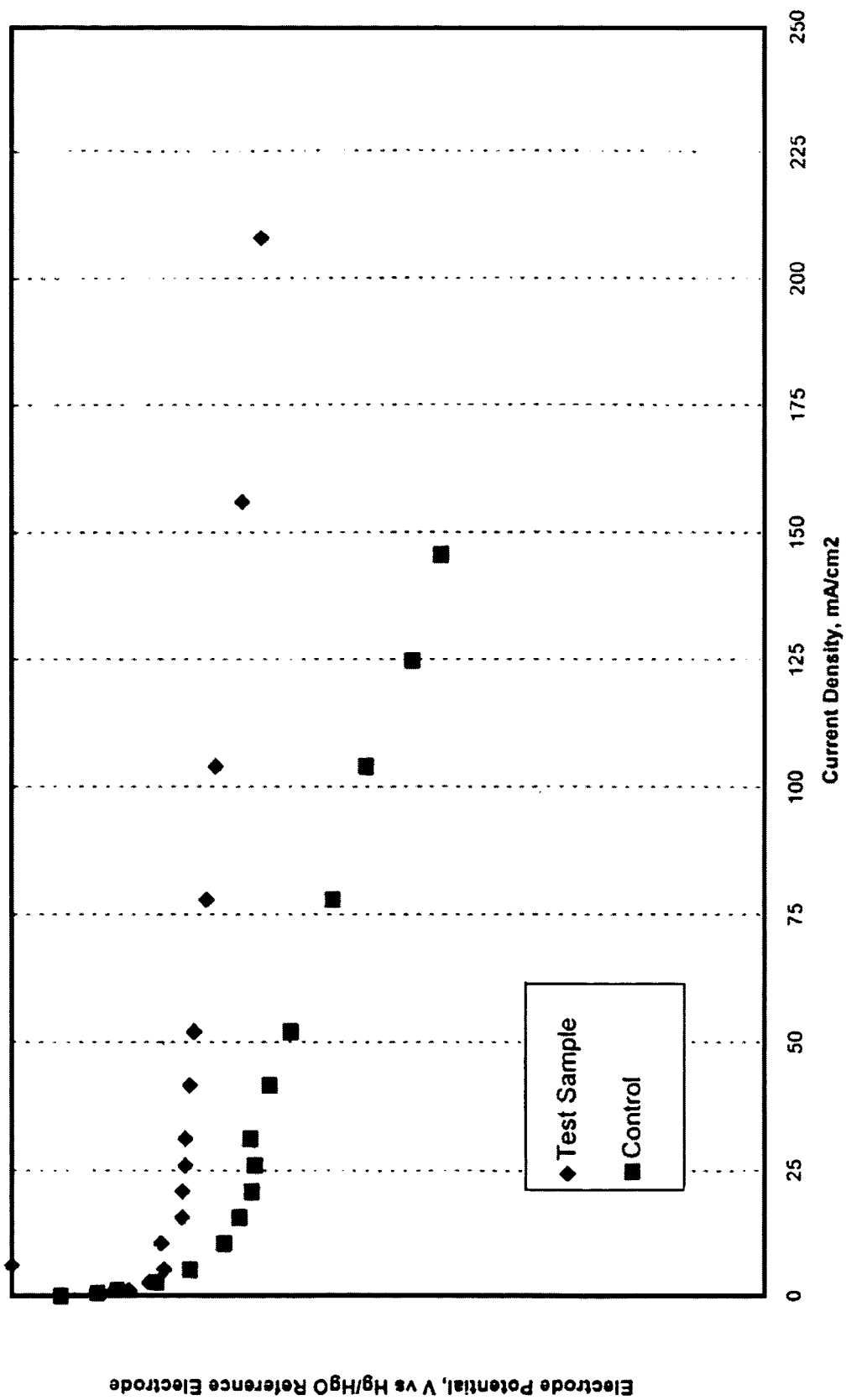
FIG. 3a is a plot of electrode potential (volts) of the cathode versus the current density (mA/cm$^2$) for both the redox cathode of the instant invention and the comparative cathode.
Figure 3B:
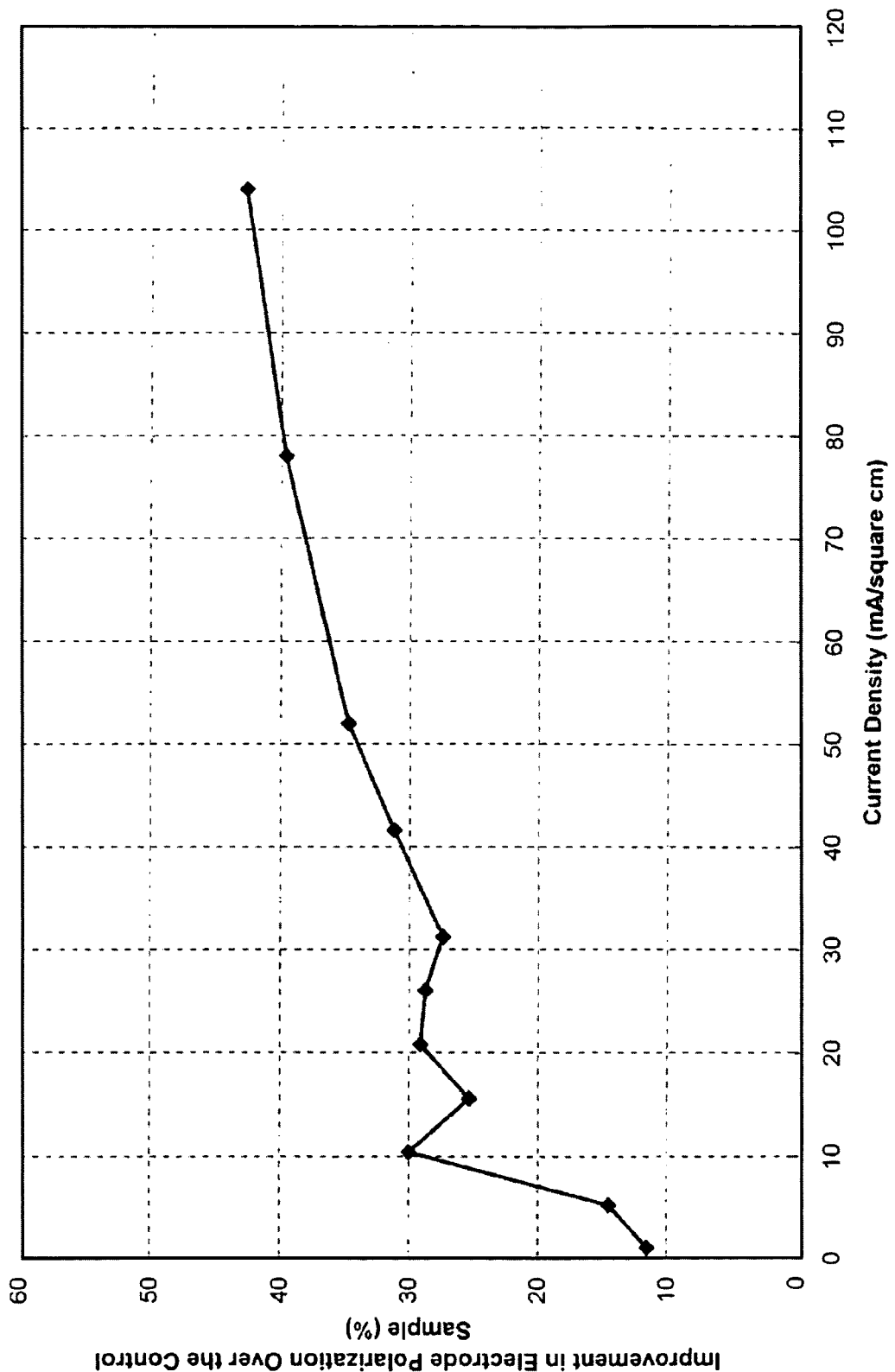
FIG. 3b is a plot of percentage improvement of the voltage (reduction of polarization of the electrode) of the inventive cathode over the comparative cathode versus the current density (mA/cm$^2$)

FIG. 3a is a plot of electrode potential (volts) of the cathode versus the current density (mA/cm$^2$) for both the inventive valency change redox couple cathode (♦ symbol) and the comparative cathode (■ symbol). Each data point represents 5 minutes of discharge at that particular current density. Thus as can be seen, the electrode potential for the inventive cathode is always higher than that of the control sample (at useful current densities) and as the current density increases (i.e. higher power) the voltage of the control sample drops off much more rapidly than that of the inventive cathode (which drops only slightly by comparison) FIG. 3b is a plot of percentage improvement of the voltage (reduction of polarization of the electrode) of the inventive cathode over the comparative cathode versus the current density (mA/cm$^2$). As may be seen from this graph, at useful current densities, the improvement in the polarization of the inventive electrode is anywhere from 30% to 50% over that of the comparative cathode. Thus, FIGS. 3a and 3b show that the cell is fully capable of operating for longer than 2.5 minutes (the capacity base of only the silver oxide in the cathode) and at a higher voltage than the comparative cathode. Therefore, it is apparent that continuous replenishment of oxygen into the silver oxide redox couple via a change in the valency state of the redox couple by the supplied air is being accomplished.

It should be noted that cathodes containing in the range of 1–20% by weight of silver oxide (in paste B) were produced. Cathodes having lower amounts of silver oxide than the 10% in the cathode of the example (i.e. in the 1% range) showed the same effects, although somewhat diminished. Cathodes produced with higher than the 10% silver oxide of the example cathode (i.e. about 20%) showed no increased effect over the sample cathode. Thus, the effective range appears bounded by a lower limit of about 0.5% silver oxide. The upper limit of silver oxide inclusion seems to only be bounded by factors such as cost and the need for carbon to catalyze the reaction at the electrode/electrolyte interface. This range limit, determined by empirical means, applies only to silver, and other redox couples will have their own limits on the range of inclusion which may be determined by similar simple experimental trials.

Figure 4:
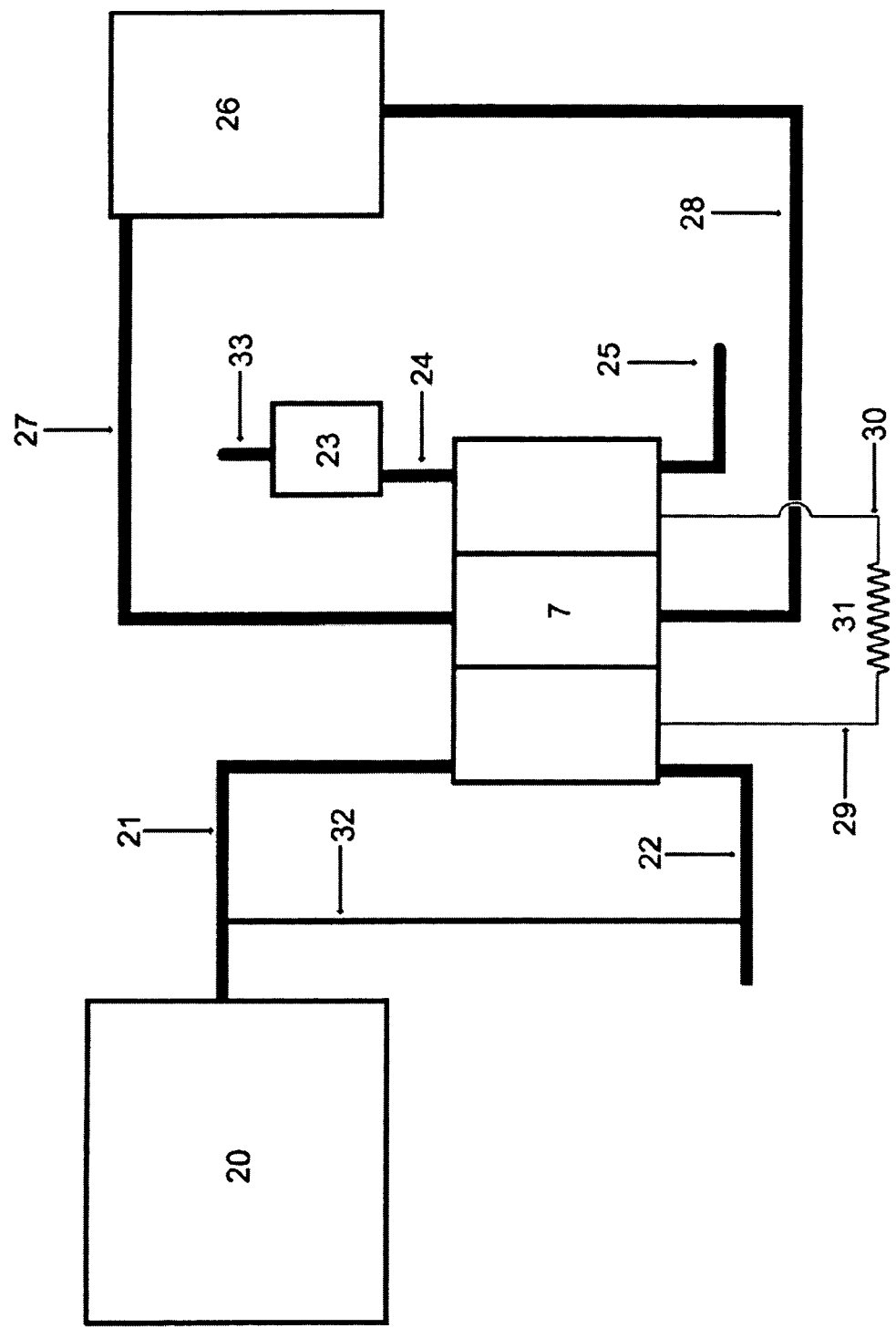
FIG. 4 is a stylized schematic depiction of an energy supply system incorporating the instant startup alkaline fuel cell of a preferred embodiment of the instant invention.

FIG. 4 is a stylized schematic depiction of an energy supply system incorporating the alkaline fuel cell 7 of the instant invention. The energy supply system also includes a source of hydrogen 20. The source may be of any known type, such as a hydride bed storage system, a compressed hydrogen storage tank, a liquid hydrogen storage tank, or a hydrocarbon fuel reformer. The preferred source is a metal hydride storage system. The hydrogen from the source 20 is transported to the fuel cell 7 via input line 21, and excess gases are vented through output line 22. A portion of the gases from output line 22 may be recycled to input line 21 through recycle line 32. The energy supply system also includes a source of oxygen, which is preferably air. The air is drawn into line 33 and then can be passed through a carbon dioxide scrubber 23. The air is then transported to the fuel cell 7 via input line 24. Excess air and unused gases are vented through output line 25. Since this gas stream contains no harmful gases, it may be vented to the environment directly.

The energy supply system also includes an electrolyte recirculation system. The electrolyte from the fuel cell 7 is removed through output line 28 and sent to an electrolyte conditioner 26. The electrolyte conditioner 26 heats or cools the electrolyte as needed and removes/adds water as necessary. The conditioned electrolyte is then returned to the fuel cell 7 via input line 27.

Finally the energy supply system includes electrical leads 29 and 30 which supply electricity from the fuel cell 7 to a load 31. The load can be any device requiring power, but particularly contemplated is the power and drive systems of an automobile.

The instant fuel cell and energy supply systems incorporating it are particularly useful for applications in which instant start and energy recapture are requirements thereof, such as for example in powering a vehicle. For instance, in consumer vehicle use, a fuel cell that has the built in hydrogen and oxygen storage of the instant invention has the advantage of being able to start producing energy instantly from the reactants stored in it's electrodes. Thus, there is no lag time while waiting for hydrogen to be supplied from external sources. Additionally, because hydrogen and oxygen can be adsorbed and stored in the respective electrode materials of the fuel cell, energy recapture can be achieved as well. Therefore, activities such as regenerative braking, etc., can be performed without the need for an battery external to the fuel cell because any reactants produced by running the fuel cell in reverse will be stored in the electrodes of the fuel cell. Therefore, in essence, fuel cells employing the instant active electrode materials are the equivalent of a fuel cell combined with a battery. In such a system employing the valency change redox couples, oxygen is able to be stored within the electrode via a change in the valency state of the redox couple to a significant degree. Such couples may be a metal/metal oxide couple, a hydroxide/oxyhydroxide couple, a metal oxide/oxide couple, or combinations thereof.

The novel electrochemical cell of the present invention also enables the practice of the method of the invention which, in one embodiment thereof, comprises the indirect and continuous introduction of both the fuel, preferably hydrogen, and the reactant which oxidizes the fuel, preferably oxygen, for the continuous operation of the electrochemical cell as a fuel cell. That is, the hydrogen is, during operation, continuously introduced through a catalytic region in the negative electrode and continuously stored as a hydride in a region of material in the negative electrode which is capable of reversibly storing and releasing hydrogen. Simultaneously, hydrogen is electrochemically released from the electrolyte side of the negative electrode to participate in the cell reaction process while a continuous supply of hydrogen at the gas side is stored within the anode replacing the hydrogen reacted at the electrolyte side.

At the same time oxygen is continuously introduced at the gas side of the positive electrode through a catalytic region and chemically stored via a valency change mechanism as a material in the form of the charged state of an oxide couple which participates in the cell reaction. Simultaneously with the introduction and chemical storage of the oxygen as just explained the material of the valency change redox couple which is in the charged state participates in the cell reaction to generate electrical power. Thus an electrochemical cell is continuously operated through the supply to the gas side, storage within, and release from the electrolyte side of, the oxidant so that operation as a fuel cell is enabled. The unique method of the invention of operation of an electrochemical cell as a fuel cell is thus made possible. In the situations in which the fuel cell is run "backwards" or as an electrolyzer to recapture and store energy, such as for example, during regenerative braking, the operating nature as described earlier would not be considered to be disruptive to "continuous" operation.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. In a electrochemical cell, a cathode comprising:
a cathode active material including a valency change material for storing and supplying oxygen via a change in the valency state of said valency change material.

2. The cathode according to claim 1, wherein said valency change material is a nickel hydroxide/nickel oxyhydroxide redox couple.

3. The cathode according to claim 1, wherein said valency change material comprises a metal/metal oxide redox couple of an element selected from the group consisting of copper, silver, zinc and cadmium.

4. The cathode according to claim 1, wherein said valency change material comprises a metal oxide/oxide redox couple of a metal selected from tin or manganese.

5. The cathode according to claim 1, wherein said valency change material comprises a cobalt hydroxide/oxyhydroxide redox couple.

6. The cathode of claim 1, further including a hydrophobic component.

7. The cathode of claim 6, wherein said hydrophobic component comprises polytetrafluoroethylene.

8. The cathode of claim 7, wherein said polytetrafluoroethylene is at least one of:
   a) intimately mixed with said cathode active material;
   b) graded within said cathode active material; or
   c) a separate layer within said cathode.

9. The cathode of claim 1, further including a current collector extending within said active material.

10. The cathode of claim 9 wherein said current collector comprises an electrically conductive mesh, grid, foam or expanded metal.

11. The cathode of claim 1, further including a catalytic carbon component.

12. A cathode active material for a cathode comprising:
   a valency change material for storing and supplying oxygen via a change in valency during use of said cathode.

13. The cathode active material according to claim 12, wherein said valency change material is a nickel hydroxide/nickel oxyhydroxide redox couple.

14. The cathode active material according to claim 12, wherein said valency change material comprises a metal/metal oxide redox couple of an element selected from the group consisting of copper, silver, zinc and cadmium.

15. The cathode active material according to claim 12, wherein said valency change material comprises a metal oxide/oxide redox couple of a metal selected from tin or manganese.

16. The cathode active material according to claim 12, wherein said valency change material comprises a cobalt hydroxide/oxyhydroxide redox couple.

* * * * *